United States Patent [19]

Orwin

[11] 4,007,818
[45] Feb. 15, 1977

[54] NEW OR IMPROVED TORQUE LIMITING CLUTCH

[75] Inventor: Olaf John Barclay Orwin, Birmingham, England

[73] Assignee: Gib Precision Limited, Cirencester, England

[22] Filed: June 12, 1975

[21] Appl. No.: 586,279

[30] Foreign Application Priority Data

June 13, 1974 United Kingdom ............ 26229/74
Apr. 5, 1975 United Kingdom ............ 14050/75

[52] U.S. Cl. ........................................ 192/56 R
[51] Int. Cl.[2] ...................................... F16D 43/20
[58] Field of Search ................. 192/56 R, 150
[56] References Cited

UNITED STATES PATENTS

| 3,095,955 | 7/1963 | Orwin | 192/56 R |
|---|---|---|---|
| 3,185,275 | 5/1965 | Orwin | 192/56 R |
| 3,270,844 | 9/1966 | Orwin | 192/56 R |
| 3,305,058 | 2/1967 | Orwin et al. | 192/56 R |
| 3,429,407 | 2/1969 | Orwin et al. | 192/56 R |
| 3,722,644 | 3/1973 | Steinhagen | 192/56 R |

*Primary Examiner*—Allan D. Herrmann
*Attorney, Agent, or Firm*—Merriam, Marshall, Shapiro & Klose

[57] ABSTRACT

A torque limiting clutch including driving and driven members maintained in driving engagement with rolling torque transmitting elements by spring means in which spacer elements are movable into spacing engagement with the driving and driven members on overrunning of the clutch while the torque transmitting elements are maintained within receiving means and in which the torque transmitting elements are free from pressure engagement with the driving or driven member, not provided with the receiving means, during overrunning of the clutch. The spacer elements may be in rolling engagement with the driving and driven members and one of said members may be provided with a track for the spacer elements which track is rotatable relative to said one member.

20 Claims, 24 Drawing Figures

NEW OR IMPROVED TORQUE LIMITING CLUTCH

BACKGROUND OF THE INVENTION

This invention relates to a torque limiting clutch of the type comprising opposed first and second members mounted for relative rotational and axial movement, a third member positioned between and mounted for rotational movement relative to the first and second members and for axial movement relative to at least one of the first and second members, the third member being provided with a torque transmitting element receiving aperture, a torque transmitting rolling element being positioned in the aperture in the third member, the first member comprising a driven member and being provided with a torque transmitting abutment for torque transmitting engagement with said torque transmitting element, another of said members comprising a driving member and being provided with a torque transmitting abutment for torque transmitting engagement with said torque transmitting element, resilient loading means to bias resiliently the first and second members towards one another and the arrangement being such that when the clutch is transmitting torque the torque transmitting element is engaged with a driving member abutment and a driven member abutment so as thereby to prevent relative rotation between the driving and driven members and so that, on the torque to be transmitted exceeding a predetermined value, the torque transmitting element disengages from the abutment of at least one of the driving and driven members to permit of the members rotating relative to one another. Such a torque limiting clutch will be referred to hereinafter as "of the type described."

A torque limiting clutch of the type described may be constructed so that the said first member comprises the driven member and said second member comprises the driving member. In this case the third member comprises only a torque transmitting element guide member and does itself not transmit torque.

Alternatively an overload clutch of the type described may be constructed so that said first member comprises the driven member and said third member comprises the driving member. In this case the third member acts both as a torque transmitting element guide member and also as the driving member, the aperture in the third member serving both as a guide means and as a torque transmitting abutment.

When a clutch of the type described is subjected to a torque in excess of the predetermined value for a long period of time performance of the clutch deteriorates due to repeated engagement and disengagement of the torque transmitting elements with the abutments.

There has been proposed in U.S. Pat. Nos. 3,722,644 and 3,774,738 torque limiting clutches of the type described provided with spacing key assemblies arranged to be movable from an inoperative position, occupied during normal torque transmission by the clutch, to an operative position, occupied when the clutch is disengaged, in which the keys are positioned between the clutch members to maintain the clutch members spaced apart, the torque transmitting elements are received in a receiving means in one of the members and spring means are provided to continuously urge the torque transmitting elements out of the receiving means against the other clutch member for engagement with torque transmitting abutments thereon in order to permit resetting of the torque limiter on relative rotation of the clutch elements in the reverse direction.

In practice after a torque limiting clutch of the type described has disengaged it frequently occurs that the driving member is continued to be rotated for a considerable period of time. Thus, in the case of the clutches disclosed in said U.S. patent specification on such continued relative rotation between the clutch members because of the continuous spring bias urging the torque transmitting elements out of their receiving means against the other clutch member the torque transmitting elements are impacted into, and out of, the torque transmitting abutments of the other member each time such an abutment passes each torque transmitting element. This leads to considerable wear of the torque transmitting elements, guide member and abutments and can lead to their eventual disintegration. Moreover the clutch may re-engage leading to damage of the apparatus which the clutch is intended to protect.

SUMMARY OF THE INVENTION

Accordingly it is an object of the present invention to provide a torque limiting clutch of the type described in which the above mentioned disadvantages are avoided.

According to one aspect of the present invention there is provided a clutch of the type described including a spacer element received in an opening in the third member and positioned between a first track axially located relative to one of the members and a second track axially located relative to another one of the members, a spacer element receiving means provided on at least one of the tracks and of such dimensions as to maintain the spacer element out of pressure contact with the tracks during torque transmittal so as to ensure the torque transmitting element is maintained in pressure contact with the driven and second members and a torque transmitting element receiving means provided on one of said driven and second members, whereby on disengagement of the torque transmitting element from the torque transmitting abutment in the driven member the third member is caused to rotate relative to the driven member and hence cause circumferential movement of the spacer element out of the spacer element receiving means and subsequently to cause the torque transmitting element to be engaged and maintained within the torque transmitting element receiving means with the driven and second members spaced apart by the spacer elements, the torque transmitting element receiving means being of such dimensions that the torque transmitting element is maintained out of pressure engagement with the driven and second members and relative rotation between the driving and driven members is permitted when the torque transmitting element receiving means, and wherein during overload the torque transmitting element is not continuously biased out of the torque transmitting element receiving means.

Besides the above described problems occurring on continued relative rotation between the clutch members, the clutches which are described in said U.S. specifications are relatively difficult to reset due to the torque required to be applied to the clutch members during resetting in order to force the clutch members apart, against spring bias, and to overcome friction between the relatively sliding balls and clutch member.

Thus, a further object of the present invention is to provide a torque limiting clutch of the type described which can be relatively easily reset.

According to another aspect of the invention we provide a torque limiting clutch of the type described including a spacer element received in an opening in the third member and positioned between a first track axially located relative to one of the members and a second track axially located relative to another one of the members, a spacer element receiving means provided on at least one of the tracks and of such dimensions as to maintain the spacer element out of pressure contact with the tracks during torque transmittal so as to ensure the torque transmitting element is maintained in pressure contact with the driven and second members, and a torque transmitting element receiving means provided on one of said driven and second members, whereby on disengagement of the torque transmitting element from the torque transmitting abutment in the driven member the third member is caused to rotate relative to the driven member and hence cause circumferential movement of the spacer element out of the spacer element receiving means and subsequently to cause the torque transmitting element to be engaged and maintained within the torque transmitting element receiving means with the driven and second members spaced apart by the spacer elements, the torque transmitting element receiving means being of such dimensions that the torque transmitting element is maintained out of pressure engagement with the driven and second members and relative rotation between the driving and driven members is permitted when the torque transmitting element is engaged in the torque transmitting element receiving means, and wherein the spacer element engages at least one of the tracks through anti-friction means.

BRIEF DESCRIPTION OF THE DRAWINGS

The invention will now be described in more detail by way of example with reference to the accompanying drawings wherein:

FIG. 1b is a similar plan view of the torque limiting clutch of FIG. 1 but showing the parts after disengagement.

FIG. 6 is a plan view of a driving clutch member of the clutch of FIG. 1a,

FIG. 7 is a section on the line 7—7 of FIG. 6,

DESCRIPTION OF THE PREFERRED EMBODIMENTS

Referring to FIGS. 1 to 9 of the drawings there is illustrated a torque limiting clutch comprising drive transmitting members 10 and 17. In this example the member 10 will be described as a driving member and the member 17 as a driving member but it should be understood that if desired the member 17 may be the driving member and the member 10 would then be a driven member. The interchangeability of these terms should be appreciated throughout this specification and claims.

Figures 1A, 2:
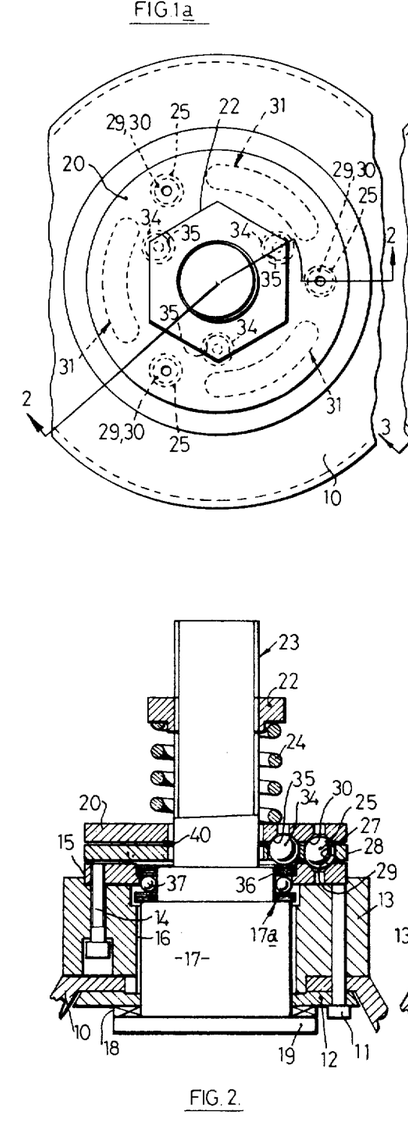
FIG. 1a is a diagrammatic fragmentary plan view of a torque limiting clutch embodying the invention showing the parts in torque transmitting relationship.
FIG. 2 is a diagrammatic cross-sectional view on the line 2—2 of FIG. 1a, FIG. 3 is a diagrammatic cross-sectional view on the line 3—3 of FIG. 1b

The driving member 10 comprises in this example a belt pulley adapted to be driven by a belt drive from a prime mover, not shown, in conventional manner. The driving member 10 is connected by means of bolts 11 and a clamping washer 12 to a body 13 of the torque limiting clutch which is attached, by bolts 14, to a second or clutch member 15.

Rotatably mounted within the body 13 by means of a suitable bearing sleeve 16 is an output member 17 which constitutes a driven member of the clutch. A suitable thrust race 18 is interposed between a flange 19 on the output member 17 and the clamping washer 12.

Splined to the output member 17 is a first or driven clutch member 20 for axially sliding and non-rotating movement relative to the output member 17. A nut 22 is threadedly engaged with the outer end 23 of the output member 17 and a coil compression spring 24 is interposed between the nut 22 and the driven clutch member 20 to urge the clutch member 20 towards the driving clutch member 15.

Interposed between the driving and driven clutch members 15, 20 respectively are a plurality (in the present example three) of torque transmitting elements in the form of spherical hardened steel balls 25. The balls 25 are received in cylindrical bores 27 formed in a third or ball guide member 28.

For a reason hereinafter to be described, there may be provided a ball control means, comprising a coil compression spring 27a received with a cylindrical bore 27b which extends radially from each bore 27, (see FIG. 8) to act on the ball 25 therewithin in a direction radial to the axis of rotation of the clutch and thus to urge the ball lightly against one side of its associated bore 27 thereby to restrain the ball from axial movement in the disengaged condition of the clutch as hereafter described.

Each clutch member 15, 20 is also formed with a corresponding number (in the present example three) of torque transmitting abutments 29, 30 respectively each taking the form, as best shown in FIGS. 4 to 7 of a generally frusto-conical recess.

The torque transmitting abutments 29, 30 and bores 27 are arranged so as to be mutually registerable so that the balls 25 can be received in the bores 27 and engage both the driven and driving abutment 29, 30 to permit the transmission of torque as hereinafter to be described in more detail and as shown in FIGS. 1a and 2.

Figures 1B, 3:
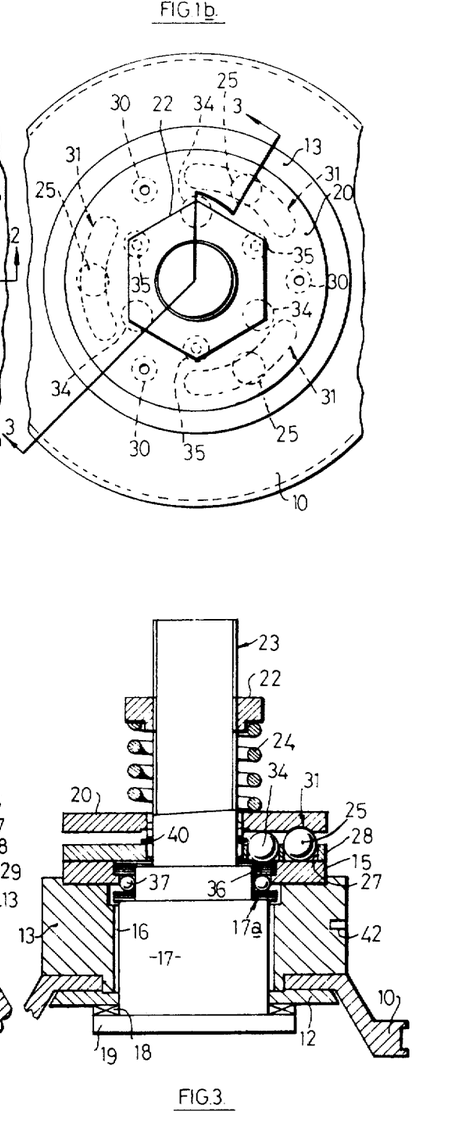
Figures 4, 5:
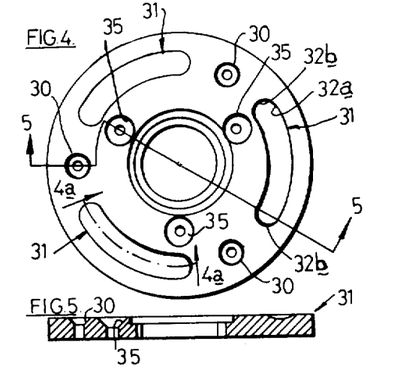
FIG. 4 is a plan view of a driven clutch member of the clutch of FIG. 1.
FIG. 5 is a section on the line 5—5 of FIG. 4.
Figure 4A:
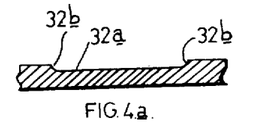
FIG. 4a is a developed longitudinal section on the line 4a—4a of FIG. 4.
Figures 6, 7:
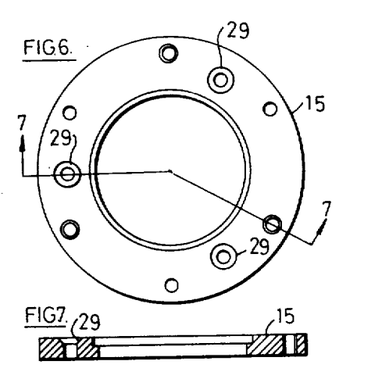
Figure 8:
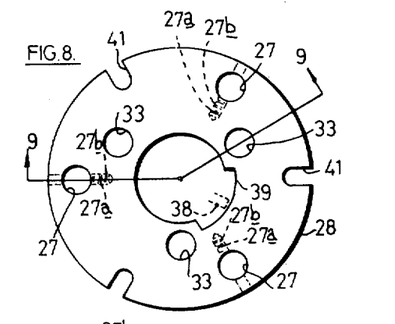
FIG. 8 is a plan view of the ball guide member of the clutch of FIG. 1.
Figure 9:
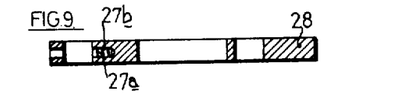
FIG. 9 is a section on the line 9—9 of FIG. 8.

The driven clutch member 20 is also formed with a plurality (in the present example three) of torque transmitting element receiving means 31, each comprising an arcuate depression 32a, extending over an arc of approximately 60°, of part circular cross-section and having inclined end faces 32b, see FIG. 4a. If desired the receiving means may be of a different shape, for example, a recess of shallow frusto-conical configuration, the half angle of the cone may be, for example, 80°, so that the surface of the cone is inclined to the surface of the clutch member 20 at an angle of 10°. Alternatively they may be of identical shape to the torque transmitting abutments 30. The dimensions of the receiving means 31 are such, as best shown in FIG. 3, that the balls 25 have a slight clearance between the receiving means 31 and the surface of the driving clutch member 15, in the region intermediate the recesses 29, whereby no pressure is imposed between the balls 25 and the surface of the member 15 whilst the balls are within the receiving means 31.

The ball guide member 28 is also formed with three spacer element receiving bores 33 within which are received spherical spacer elements or balls 34.

The driven clutch member 20 is provided with three spacer element receiving means 35 each of frusto-conical configuration, as best shown in FIGS. 4 and 5.

A first track for the spacer elements 34 is provided by means of an annular member 36 received in a rebate 17a formed in the output member 17. In order to permit free rotation of the track 36 relative to the output member 17 a relatively friction-free bearing is provided between the track and the out-put member. The bearing is preferably in the form of a crowded race 37 although any other suitable relatively friction free bearing may be used.

Restraining means are provided to limit rotation of the ball guide member 28 relative to the output member 17 and hence relative to the driven clutch member 20. In the present example the restraining means comprises at least one peg 38 shown in dotted line in FIG. 8 extending radially outwardly of the member 17 and received in an annular cutout 39 (or cut-outs if more than one peg is provided) in the guide member 28. The, or each, peg is arranged to engage one end of the cutout 39 within which it is received when the torque transmitting balls are aligned with the central part of the receiving means 31.

The ball guide member is prevented from axial movement in the direction away from the driving clutch member 15 by means of a circlip 40.

Formed in the ball guide member 28 are three radial slots 41 whilst in the body 13 are formed three cylindrical recesses 42 for a purpose hereinafter to be described.

In use, during torque transmittal the balls 25 are engaged in the torque transmitting abutments 29, 30 and are prevented from moving out of engagement therewith as a result of the forece applied to the driven clutch member 20 by the coil compression spring 24. The torque transmitted from the driving member 10 to the driven or output member 17 through the balls produces an axially directed reaction force between the balls and the driving and driven members proportional to the transmitted torque which, when the torque exceeds a predetermined value, is sufficient to overcome the pressure exerted by the spring 24. Thus, the driven clutch member 20 commences to move axially away from the driving clutch members 15 and simultaneously each ball 25 commences to roll in the direction of rotation of the driving clutch member 15 on that part of each driving and driven clutch member recess edge which is respectively rearmost and foremost in the direction of rotation. Therefore, the balls 25 now commence to move out of torque transmitting engagement with the recesses 29 and 30 by a simple rolling movement permitted by the engagement between the balls and the edges of the recesses 29 and 30. As the balls rotate they also move circumferentially relative to the driving and driven clutch members 15 and 20 thereby causing the ball guide member 28 to also move circumferentially relative thereto.

This causes the spacer elements 34 to move out of their recesses 35 onto the planar parts of the clutch member 20 between the recesses these planar parts comprise a second track. As shown in FIGS. 2 and 3, the surface of the track 36 is very slightly below the level of the planar part of the clutch member 15 and hence, at this stage, the spacer elements 34 are maintained out of pressure engagement with the track 36 and the clutch member 20.

Rotation of the guide member 28 continues until the torque transmitting balls 25 enter their respective receiving means 31, as shown in FIG. 3. As the balls 25 enter the receiving means 31 they move out of pressure engagement with the member 20 and 15 and hence the whole of the load imposed by the spring 24 on the member 20 is taken by the spacer members 34 which are engaged with the track 36 and with planar parts of the clutch member 20 between the recesses 35.

When the balls 25 have entered the receiving means 31 and hence no longer drive the guide member 28 any continuing rotation of the guide member 28 due to inertia is arrested by the hereinbefore described restraining means 38 and 39 and hence the balls 25 are maintained within their receiving means 31.

Because of the fact that the torque transmitting elements 25 are maintained completely unloaded after disengagement of the torque transmitting connection no damage or wear will occur to the torque transmitting parts of the torque limiter if the driving member is continued to be rotated after the torque limiter has disengaged.

Because there is no pressure engagement between the balls 25 and the member 15 the torque limiting clutch can operate without the provision of the springs 27a as if the balls 25 should enter into and out of engagement with the recesses 29 under unloaded conditions this would not cause any significant wear of the parts. Moreover, in practice, the balls 25 would only enter into and out of engagement with the recesses 29 on relatively few occasions as there is nothing to force them out of the recesses 31.

If desired, however, the springs 27a may be provided to retain the balls in the receiving means 31 and thus prevent any chatter and so make the clutch quieter in operation.

Instead of the springs 27a other ball contol means may be provided. In appropriate circumstances there may be provided a frusto-conically shaped bore in the ball guide member with its wide end adjacent the member 20. In the case where the member 17 is the driven member then the balls will be urged, as a result of centrifugal force, towards the wide end of the balls and hence away from the clutch member 15. In the case where the member 17 is the driven member and the axis of rotation of the clutch is horizontal then the action of gravity will cause the balls to run towards the wide end of the balls and hence away from the member 15.

Alternatively, the balls may be engaged by spring fingers provided on circlips engaged with the bores 27 in the ball guide member 28 so as to bias the balls in the direction away from the member 15 under unloaded conditions but permitting engagement of the balls within the recesses 29 of the member 15 when the torque limiter is in torque transmitting engagement and also during resetting of the torque limiter.

In the above example the track 36 is mounted on the crowded race 37 and the means for restraining continued rotation of the guide member 28 comprises at least one peg 38 and recess 39. In appropriate circumstances, as described hereinafter, the restraining means may be provided by arranging that the track 36 instead of being mounted by a relatively friction free bearing is in frictional engagement with the output member 17 to a controlled extent, for example, by providing one or more friction pads between the clutch member 20 and ball guide member 28, the friction being arranged so as to provide just sufficient friction to prevent rotation of the ball guide member sufficiently far to cause disengagement of the torque transmitting elements from their receiving means whilst not causing sufficient friction to unduly affect resetting. Alternatively the restraint to rotation of the track 36 could be arranged to be rendered inoperative when it is desired to reset the torque limiter.

It has been found that where the clutch is to transmit a relatively large torque, and hence the force applied by the spring 24 is relatively high, when it was desired to reset the clutch it was necessary to apply a relatively large torque to the clutch in order to overcome the friction created on resetting as a result of sliding engagement between the track 36, member 17, spacer balls 34 and driven clutch member 20.

The force necessary to overcome this friction has been found to be unacceptably high, particularly for the larger sizes of clutch. It is accordingly preferred, at least for the larger size of clutch, to mount the track on a relatively friction free bearing.

In order to reset the torque limiter it is necessary to move the torque transmitting balls 25 out of the receiving means 31 and into the torque transmitting recesses 29, 30.

This is achieved by moving the balls 25 relative to at least one of the clutch members 15, 20 by means of the guide member 28. By utilising the guide member 28 to effect the relative movement there is avoided the use of springs or other biasing means, to continuously urge the balls out of the recesses 31 into engagement with the clutch member 15 so as to be in a position to be engaged by the torque transmitting recesses of the member 15 on resetting movement of the torque limiter. Hence in the clutch of this invention the torque transmitting balls are maintained in completely unloaded condition, at least in a direction towards the member 15, when the torque transmitting connection has been disengaged.

The guide member 28 may be used to cause the above mentioned relative movement in a number of ways.

For example the ball guide member 28 is rotated relative to the driven clutch member 20 in the reverse direction to that in which the member 28 moves on disengagement of the clutch, until the torque transmitting balls 25 are in a position where they engage the inclined end face 32b of the ball receiving means 31 and simultaneously engage the planar face of the driving member 15. This movement of the ball guide member 28 is permitted without sliding between the spacer elements 34 and the driven clutch member 20 as a result of rotation of the track 36 relative to the clutch member 20 which permits rotation of the spacer elements 34. If the track 36 is not freely rotatable relative to the member 17 then sliding between the elements 34 and the member 20 occurs but as the annular extent of the rotation is relatively small this sliding movement is possible, particularly if a suitable tool is engaged with one of the slots 41 in the guide member 28.

When the torque transmitting balls 25 have been moved into this position, a suitable tool is engaged in one of the recesses 42 in the body 13 and the body 13 is rotated thereby (with rotation still being applied if necessary, to the guide member 28 to maintain the balls 25 in simultaneous engagement with the faces 32b and the planar face of the driving clutch member 15) in a direction to cause relative rotation between the clutch member 15 and the clutch member 20 so that the balls roll up the faces 32b of the ball receiving means 31 and onto the planar part of the driven clutch member 20 with consequent movement of the member 20 away from the member 15 and compression of the spring 24. If necessary the member 20 may be held against rotation if it is not held sufficiently by the apparatus to which it is connected.

The body 13 is then further rotated with the balls 25 rolling between the planar faces of the clutch members 15 and 20 and, depending upon the angular orientation of the member 15 relative to the member 20 when the guide member 28 is rotated to move the balls so that they simultaneously engage the faces 32b and the planar face of the member 15, the balls 25 will next either enter the torque transmitting recesses 29 or the torque transmitting recesses 30.

If the balls first enter the recesses 29, the driven member 20 moves towards the driving member 15 so that it is spaced from the driving member 15 by the spacer balls 34 and hence the balls 25 are not subject to any pressure from the spring 24. During further rotation of the body 13, the cage 28 moves with the driving member 15. When the track 36 is freely rotatably mounted, relative movement between the cage 28 and the driven member 20 is permitted without sliding movement between the spacer balls 34 and the track 36 or the driven member 20 as a result of rotation of the balls 34 together with rotation of the track 36. Because the balls 25 are not subject to pressure they are not in sliding engagement with the valves 15 and 20 and so do not afford any resistance to the further relative rotation.

This further rotation continues until the balls 25 re-enter the torque transmitting abutment 30 and simultaneously the spacer balls re-enter the three spacer element receiving means 35.

The clutch is now again ready for use.

If the balls 25 enter the torque transmitting abutments 30 first, this is accompanied by simultaneous reentry of the spacer balls 34 into the spacer element receiving means 35. The members 15 and 20 are then held apart by the balls 25 with these balls 25 with these balls engaging the abutments 30 and the planar face of the driving member 15. The body 13 is now further rotated, and the balls 25 slide on the planar face of the member 15 until they re-enter the torque transmitting abutments 29. The clutch is now again ready for use.

It should be noted that in the above described method of re-engagement the original angular relationship between the driven and driving members is not necessarily preserved. The clutch will re-engage as the sets of abutments 29 and 30 which are most closely adjacent at the beginning of resetting move into alignment.

The method of resetting hereinbefore described suffers from a number of disadvantages arising from friction between relatively sliding parts and the compression of the spring 24 when the balls 25 force the members 15 and 20 apart. In order to overcome these disadvantages further arrangements of resetting have been developed as will now be described.

Figures 13, 14, 15, 16, 17, 18, 19, 20:
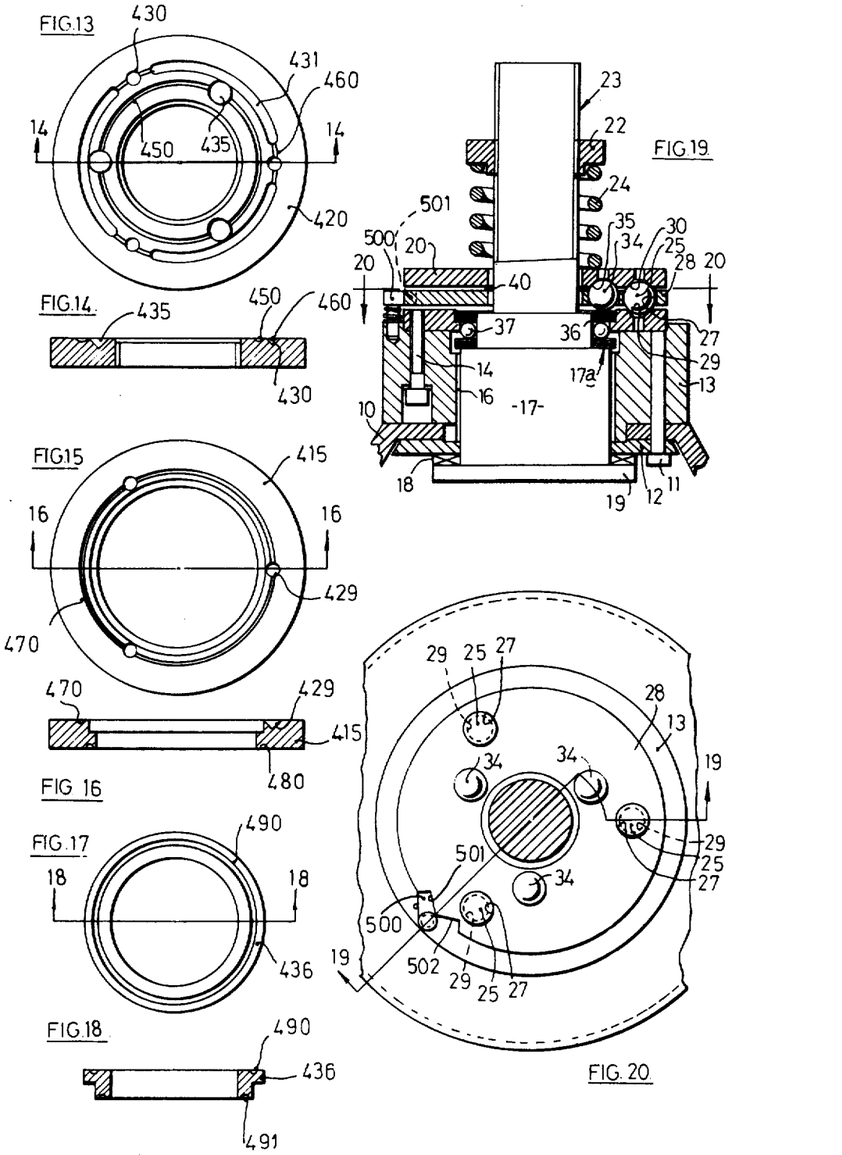
FIG. 13 is a plan view of one of the clutch members of the clutch of FIG. 12.
FIG. 14 is a section on the line 14—14 of FIG. 13.
FIG. 15 is a plan view of the other clutch member of the clutch of FIG. 12.
FIG. 16 is a section on the line 16—16 of FIG. 15.
FIG. 17 is a plan view of a track member of the clutch of FIG. 12.
FIG. 18 is a section on the line 18—18 of FIG. 17.
FIG. 19 is a section on the line 19—19 of FIG. 20 taken through another embodiment of the invention.
FIG. 20 is a section on the line 20—20 of FIG. 19

In a preferred re-setting arrangement referring to FIGS. 19 and 20, a ratchet pawl 500 is provided on the body part 13 which engages a pawl recess 501 on the guide member 28.

In this method, in order to re-set the output member 17 is rotated in the reverse direction with the ball guide member 28, and hence the balls 25 rotating therewith until the ratchet pawl 500 on the body 13 engages the pawl recess 501 on the guide member 28. The pawl recess 501 is so positioned that at this stage the abutments 29 in the member 15 will be aligned with the ball receiving recesses 27 in the cage 28.

On further rotation of the hub 17 the ball cage 28 is held stationery relative to the member 15 by the pawl 500 and the balls 25 are urged into the abutments 29 by the resultant of the forces imposed on the balls 25 by the end faces 32b of the recesses 31 and the edges of the apertures 27 in the guide member 28. The members 15 and 20 are then held apart by the spacer elements 34. Thus, during this stage, the ball guide member 28 rotates relative to the member 20, this being permitted by rolling engagement of the spacer element 34 with a planar face of the member 20 and the rotatable track 36.

This rotation will continue until the balls 25 are in register with the abutment 30 and the spacer balls 34 are in register with their receiving means 35 at which stage the balls 25 re-enter the abutments 30 and simultaneously the balls 34 re-enter their receiving means 35. The clutch is now again ready for use.

This method of re-set has considerable advantages over that described hereinbefore. This method is completely automatic and if only a single pawl and recess are used the original angular orientation of the driving and driven members is maintained.

Further, in this method of re-set as the balls 25 first re-enter the abutments 29 they do not have to be forced along the end faces 32b of the recesses 31 into rolling engagement between the planar faces of the members 15 and 20 and so the high torque which was needed to achieve this in the methods hereinbefore described is not needed in this method. A further result of the balls re-entering the abutments 29 first is that they will not slide along the planar face of the member 20 so the high torque which was necessary for the final stage of re-set in the methods hereinbefore described is avoided in this method.

If it is desired to operate the clutch so as to transmit drive in the reverse direction it is merely necessary to reverse the effective direction of operation of the pawl i.e., by engaging the ball with a recess 502 shown in dotted line in FIG. 20.

Alternatively the above described sequence of events can be performed manually by manually rotating the members 15, 20 and 28 to the above described positions. This can be done conveniently by providing a generally C-shaped spanner having one fixed tooth for engagement with a recess in the driving member 15 and one spring tooth for engagement with a recess in the guide member 28. The spanner is used initially to rotate the driving member 15 relative to the driven member 20 until the balls 25 are engaged in the drive transmitting abutments 29 of the member 15 whereupon the spring loaded tooth enters the recess on the periphery of the guide member 28. On further rotation of the spanner the driving member 15 and the guide member 28 are rotated together until the balls 25 and the spacer elements 34 are received respectively in the abutments 30 and receiving means 35.

This method of resetting has all the advantages discussed with reference to the previously described resetting arrangement except that this method is not automatic. However, this method may be used for a clutch capable of driving in either direction, it merely being necessary manually to rotate the parts in the respective reverse direction of rotation.

It will be seen from the above that a torque limiting clutch embodying the invention when reset by either of the last two described arrangements, because of the provision of rotatable spacer elements together with a track which is rotatable relative to the driven clutch member 20, upon resetting of the torque limiter no sliding movement takes place between the spacer elements 34 and the parts of the clutch into which they are urged into pressure engagement by the spring 24, i.e., the member 20 and the track 36. Upon re-setting there occurs only rolling engagement between the spacer elements 34, driven clutch member 20 and track 36 and in addition as the members 15 and 20 are not forced apart by the balls 25 the torque required to reset is maintained relatively small, compared with that which would be required to reset if sliding movement of the spacer occurred. The torque limiting clutch of the present invention can therefore be reset easily either manually or automatically and, if desired, the initial angular orientation between the driven and driving members can be maintained.

As a result of providing a friction free bearing means such as the race 37, when the clutch disengages there is a tendency for the ball guide member 28 and the balls 25 and 34 therewithin to continue to rotate as a result of their inertia, there being little or no braking of the ball guide member 28 and balls 25, 34 as a result of engagement between the track 36 and the balls 34 due to the fact that the track 36 is itself free to rotate.

It is to overcome this problem that a restraining means such as the peg and recesses 38, 39 are provided.

However, if desired, where the clutch is to be operated at suitably slow speeds of rotation, so that the inertial forces are relatively small, the ball receiving means 31 of the present invention are of sufficiently long angular extent, as described hereinbefore, in order to accommodate this relatively great angular movement of the ball guide member 28 and balls 25 upon disengagement of the clutch without the provision of a restraining means there being sufficient residual friction in the relatively friction free bearing means, such as the race 37, to arrest and maintain the balls 25 within the relatively long receiving means 31.

However, if the conditions of use of the clutch are such that the provision of the relatively long ball receiving means 31 does not avoid this problem there is provided either instead of a relatively long ball receiving means 31 i.e., by providing only a relatively short ball receiving means 31, or in addition thereto, a restraining means to limit relative rotation between the torque transmitting elements 25 and the driven clutch member 20 on disengagement of the clutch whereby the torque transmitting elements 25 are permitted to enter their respective ball receiving means 31 and are maintained therewithin. Such means may comprise the hereinbefore described peg and recess 38 and 39 or other suitable means.

Figure 10:
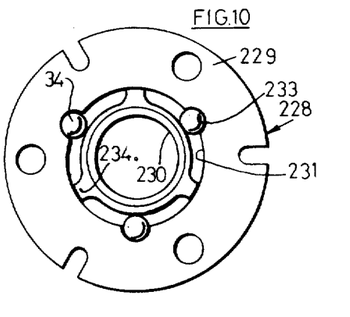
FIG. 10 is a plan view of a ball guide member of another embodiment of the invention.

One such alternative restraining means may comprise, referring to FIG. 10, a two part guide member 228 instead of the guide member 28 described hereinbefore. In this embodiment the guide member comprises an outer part 229 and an inner part 230 which is splined to the output member 17. The outer member 229 is of basically similar configuration to the member 28 except that there is a central opening 231 of a radius equal to the radial distance of the centre of each spacer element receiving opening 233 from the axis of the clutch. The inner member 230 is provided with three abutment parts 234 which are adapted to abut the spacer elements 34 in the openings 233. The member 230 is splined to the member 17 so that the abutment parts 234 are symmetrically located relative to the spacer element receiving means in the driven clutch member 20.

In use, when the parts of the clutch are in torque transmitting relationship the abutment parts 234 of the inner member 230 are located intermediate the spacer elements 34. When overload occurs continued rotation of the outer cage member 229 is arrested as a result of engagement between the spacer elements 34 engaged in the openings 233 therein and the abutment parts 234 of the inner cage part 230. Thus rotation of the torque transmitting elements to a position in which they can be disengaged from their respective receiving means is prevented.

Alternatively the inner member 230 of the ball guide member 228 may be formed integrally with the drive or output member 17 instead of being formed as a separate element splined thereto.

Further alternatively at least one spring loaded detent may be provided between the clutch member 20 and the ball guide member 28 so as to prevent relative rotation therebetween after the ball guide member has moved an appropriate distance. The strength of the or each spring loaded detent may be overcome upon resetting of the torque limiter thereby permitting resetting of the torque limiter in either direction.

Figure 11:
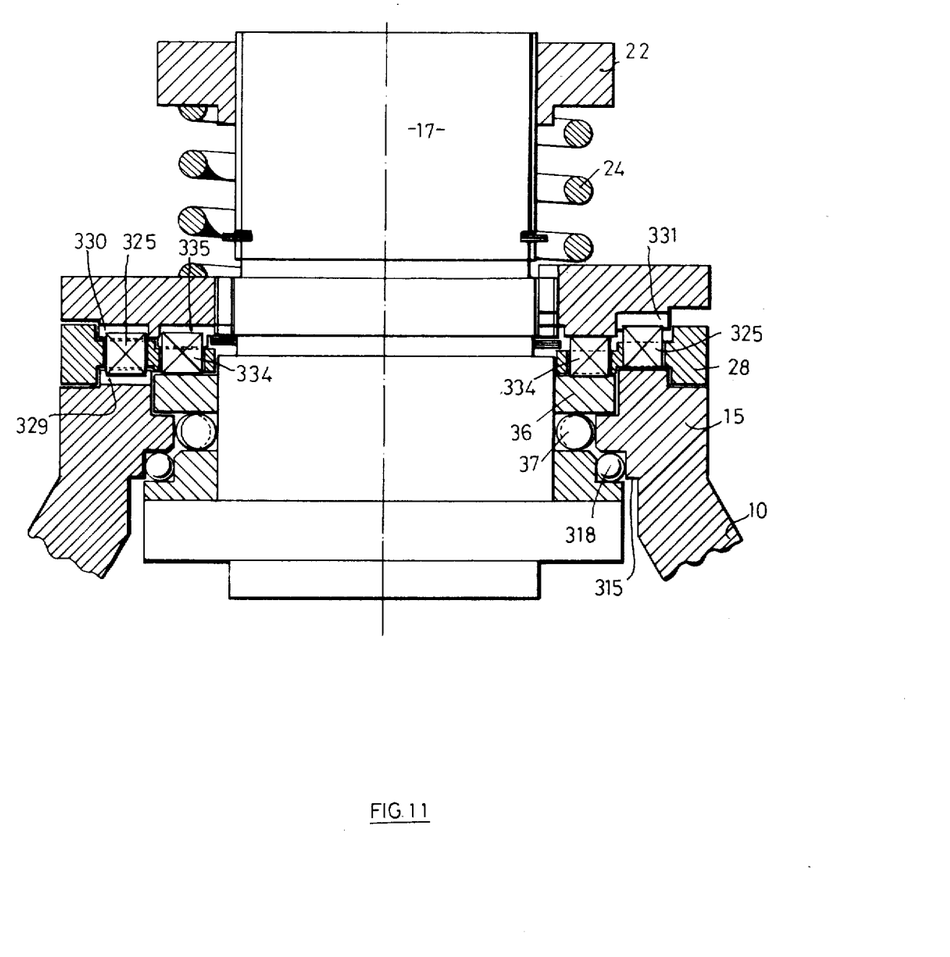
FIG. 11 is a diagrammatic sectional view through another torque limiting clutch embodying the invention, with parts omitted for clarity, the left hand half showing the parts in torque transmitting relationship and the right hand half showing the parts after disengagement.
Figure 12:
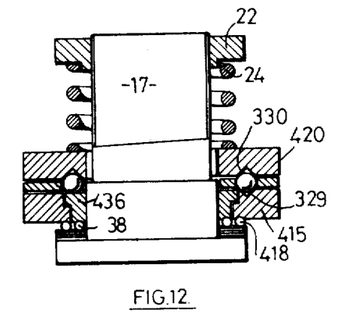
FIG. 12 is a fragmentary cross-sectional view through part of another embodiment of the invention.

Referring now to FIG. 11 there is illustrated a further embodiment of the present invention which is basically similar to the embodiment described with reference to FIGS. 1 to 9 hereof and the same reference numerals are usual to refer to corresponding parts.

In the embodiment of FIG. 11 the torque transmitting elements comprise cylindrical rollers 325 whilst the spacer elements likewise comprise cylindrical rollers 334. The track 36 is supported on a crowded race of balls 37 and the driving clutch plate 15 is rotatably mounted on the driven member 17 through the intermediary of a further crowded race of balls 318.

The torque transmitting abutments comprise prismatic notches 329 and 330 and the torque transmitting element and spacer element receiving means comprise part annular surfaces 331 and 335 respectively lie slightly below the general planar surface of the driver clutch member 20. In other respects and manner of operation the clutch of this embodiment is as described in connection with the first embodiment.

By providing the torque transmitting and spacer elements in the form of rollers a considerably smaller size of roller can be used compared with the size of ball required to transmit the same torque. Thus the overall dimensions of the torque limiting clutch can be reduced. The diameter can be reduced because rollers of shorter length than the diameter of the balls which would be required to transmit the same torque can be used. A shorter spring 24 can be used as the distance through which the clutch member 20 is displaced axially is reduced because a smaller diameter of roller can be used. The crowded race 318 to support the clutch member 15 permits the greatest possible area of the undersurface 315 of the element 15 to be available for the attachment of a drive applying means.

In FIGS. 12 to 18 there is shown diagrammatically a clutch which is basically similar to that of the first embodiment described hereinbefore and again the same reference numerals have been used to refer to the corresponding parts.

In this embodiment, as can be seen from FIGS. 12 to 18, the torque transmitting, spacer, and crowded race elements are spherical balls and the parts of the clutch engaged by these elements are formed with tracks of arcuate cross-section of a diameter equal to that of their respective element. In other respects the clutch of the present embodiment is similar to that of the first embodiment. With this arrangement there is a relatively large area of the ball in contact with its associate clutch member thereby reducing the pressure acting between the ball and the member compared with the pressure which would act if the ball engaged a planar surface. Whilst it is preferred that the grooves are of the same diameter as the ball engaged therewith a similar, though less advantageous effect is achieved by utilising a groove of slightly greater diameter than its associated ball.

Figure 21:
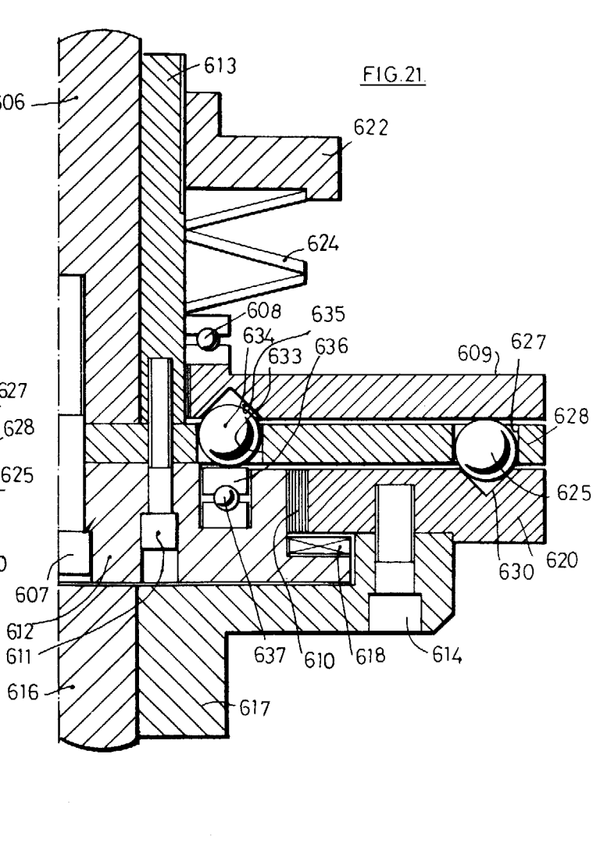
FIG. 21 is a diagrammatic half cross-sectional view through another embodiment of the invention taken on a line similar to that of FIG. 2 and showing the parts in torque transmitting relationship.
Figure 22:
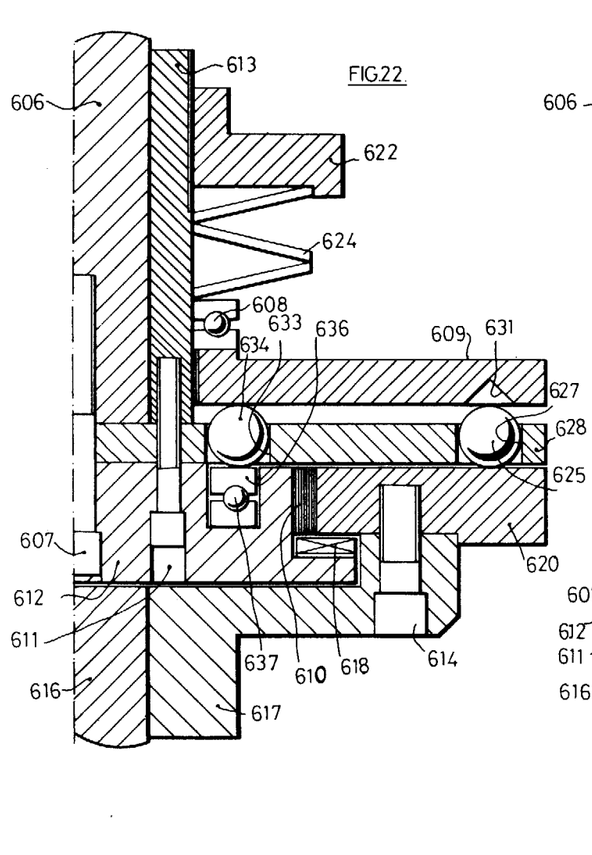
FIG. 22 is a half cross-sectional view similar to that of FIG. 21 but taken on a section similar to that of FIG. 6 and showing the parts after disengagement.

Referring now to FIGS. 21 and 22 there is illustrated an alternative embodiment in which a first drive transmitting member 620 is connected by bolts 614 to a hub 617 connected to an output shaft 616. A ball guide member 628, which consitutes a third member, is connected by a bolt 611 to a sleeve 613 as is a flange member 612 which is connected by means of a bolt 607 to an input shaft 606. In this embodiment of the invention, the first member 620 comprises a driven member and the third member 628 comprises a driving member but, as explained in connection with the first embodiment, these functions may be reversed. Interposed between the flange member 612 and the clutch member 620 is an anti-friction thrust bearing 618 and a plain journal bearing 610.

The guide member 628 is provided with two sets of three apertures 627 and 633 within which are received torque transmitting balls 625 and spacer elements 634 respectively. A ball race 637 is provided in the flange member 612 and one part 636 thereof constitutes a first track for the spacer elements 634. Rotatably mounted on the sleeve 613 is a pressure plate 609, which constitutes a second member which is forced towards the member 620 by means of a spring 624 engaged between a nut 622 on the sleeve 613 and a ball race 608. The driven clutch member 620 is provided with three conical torque transmitting abutments 630 whilst the pressure plate 609 is provided with three torque transmitting element receiving means 631 and spacer element receiving means 635.

The planar parts of the member 609 facing the part 636 of the ball race 637 comprise a second track for the spacer element 634.

The clutch of the present invention operates in the basically similar manner to the embodiments previously described. That is to say, during torque transmittal, the parts are in the position shown in FIG. 21, the torque transmitting balls 625 within the bores 627 are maintained by the pressure plate 609 in engagement with the abutments 630 so that drive imparted to the member 628 is transmitted through the balls 625 and abutments 630 to the driven member 620. In this condition the spacer elements 634 are received within their receiving means 635 which, as shown in FIG. 21, are of such dimension as to provide a clearance for the balls 634.

When the torque to be transmitted exceeds a predetermined value the balls 625 leave the abutments 630 in the member 620 thus causing movement of the pressure plate 609 away from the member 620 and permitting the balls 630 to roll on the planar parts of the members 620 and 609 causing consequent relative rotation between the members 628 and 620 so that the balls 625 roll until they are aligned with their receiving means 631 and causing the spacer balls 634 to be rolled out of alignment with their receiving means 635 into the position shown in FIG. 22.

In all other respects the clutch of the present embodiment is similar to that of the embodiments described hereinbefore.

In order to reset the torque limiting clutch of the present embodiment, initially, relative rotation is caused between the ball guide member 628 and the member 620 so that the balls 625 are aligned with the abutments 630. There is then caused relative rotation between the pressure member 609 and the aligned members 620, 628 until the spacer elements 634 enter their receiving means 635 whereupon the clutch is again ready to transmit torque.

I claim:

1. A torque limiting clutch comprising opposed first and second members mounted for relative rotational and axial movement, a third member positioned between and mounted for rotational movement relative to the first and second members and for axial movement relative to at least one of the first and second members, the third member being provided with a torque transmitting element receiving aperture, a torque transmitting rolling element being positioned in the aperture in the third member, the first member comprising a driven member and being provided with a torque transmitting abutment for torque transmitting engagement with said torque transmitting element, another of said members comprising a driving member and being provided with a torque transmitting abutment for torque transmitting engagement with said torque transmitting element, resilient loading means to bias resiliently the first and second members towards one another and the arrangement being such that when the clutch is transmitting torque the torque transmitting element is engaged with a driving member abutment and a driven member abutment so as thereby to prevent relative rotation between the driving and driven members and so that, on the torque to be transmitted exceeding a predetermined value, the torque transmitting element dis-engages from the abutment of at least one of the driving and driven members to permit of the members rotating relative to one another and including a spacer element received in an opening in the third member and positioned between a first track axially located relative to one of the members and a second track axially located relative to another one of the members, a spacer element receiving means provided on at least one of the tracks and of such dimensions as to maintain the spacer element out of pressure contact with the tracks during torque transmittal so as to ensure the torque transmitting element is maintained in pressure contact with the driven and second members, and a torque transmitting element receiving means provided on one of said driven and second members, whereby on disengagement of the torque transmitting element from the torque transmitting abutment in the driven member the third member is caused to rotate relative to the driven member and hence cause circumferential movement of the spacer element out of the spacer element receiving means and subsequently to cause the torque transmitting element to be engaged and maintained within the torque transmitting element receiving means with the driven and second members spaced apart by the spacer elements, the torque transmitting element receiving means being of such dimensions that the torque transmitting element is maintained out of pressure engagement with the driven and second members and relative rotation between the driving and driven members is permitted when the torque transmitting element is engaged in the torque transmitting element receiving means, and wherein there are means operative only during re-setting of the clutch to move the torque transmitting element into engagement under pressure with the member of the first and second members which is unprovided with a torque transmitting element receiving means.

2. A clutch according to claim 1 wherein the third member is provided with a first re-set abutment and that member of the first and second members which is unprovided with torque transmitting element receiving means is provided with a second re-set abutment, the two re-set abutments being operable during re-set re-set to mutually when the torque transmitting element receiving apertures in the third member are in register with the torque transmitting abutments provided on that member which is unprovided with the torque transmitting element receiving means.

3. A clutch according to claim 1 wherein the third member is provided with means to engage resiliently the torque transmitting element and to restrain frictionally movement of this element in the direction out of its receiving means.

4. A clutch according to claim 1 wherein the first member comprises the driven member and the second member comprises the driving member.

5. A clutch according to claim 1 wherein the spacer element engages at least one of the tracks through antifriction means.

6. A clutch according to claim 5 wherein the spacer element is in rolling engagement with at least one of the tracks.

7. A method of re-setting the clutch according to claim 1 comprising engaging the third member after overload has occurred and rotating the third member relative to the member which is provided with the torque transmitting element receiving means in order to urge the torque transmitting elements out of the torque transmitting element receiving means.

8. A method of re-setting a clutch according to claim 1 comprising, after overload has occurred, rotating that member of the first and second members which is unprovided with the torque transmitting element receiving means relative to the third member until the torque transmitting abutments in that member are in register with the torque transmitting element receiving apertures in the third member, and then rotating that member together with the third member relative to the other member of the first and second members until the torque transmitting elements are in register with the torque transmitting abutments in said other member.

9. A torque limiting clutch of the type comprising opposed first and second members mounted for relative rotational and axial movement, a third member positioned between and mounted for rotational movement relative to the first and second members and for axial movement relative to at least one of the first and second members, the third member being provided with a torque transmitting element receiving aperture, a torque transmitting rolling element being positioned in the aperture in the third member, the first member comprising a driven member and being provided with a torque transmitting abutment for torque transmitting engagement with said torque transmitting element, another of said members comprising a driving member and being provided with a torque transmitting abutment for torque transmitting engagement with said torque transmitting element, resilient loading means to bias resiliently the first and second members towards one another and the arrangement being such that when the clutch is transmitting torque the torque transmitting element is engaged with a driving member abutment and a driven member abutment so as thereby to prevent relative rotation between the driving and driven members and so that, on the torque to be transmitted exceeding a predetermined value, the torque transmitting element dis-engages from the abutment of at least one of the driving and driven members to permit of the members rotating relative to one another and including a spacer element received in an opening in the third member and positioned between a first track axially located relative to one of the members and a second track axially located relative to another one of the members, a spacer element receiving means provided on at least one of the tracks and of such dimensions as to maintain the spacer element out of pressure contact with the tracks during torque transmittal so as to ensure the torque transmitting element is maintained in pressure contact with the driven and second members, and a torque transmitting element receiving means provided on one of said driven and second members, whereby on disengagement of the torque transmitting element from the torque transmitting abutment in the driven member the third member is caused to rotate relative to the driven member and hence cause circumferential movement of the spacer element out of the spacer element receiving means and subsequently to cause the torque transmitting element to be engaged and maintained within the torque transmitting element receiving means with the driven and second members spaced apart by the spacer elements, the torque transmitting element receiving means being of such dimensions that the torque transmitting element is maintained out of pressure engagement with the driven and second members and relative rotation between the driving and driven members is permitted when the torque transmitting element is engaged in the torque transmitting element receiving means, and wherein the spacer element engages at least one of the tracks through anti-friction means.

10. A clutch according to claim 9 wherein the spacer element is rotatable and is of circular cross-section in a plane radial to its axis of rotation.

11. A clutch according to claim 10 wherein one of the tracks is mounted for rotary movement about the axis of rotation of the clutch.

12. A clutch according to claim 9 wherein restraining means are provided to restrain rotation of the third member relative to that member which is provided with torque transmitting element receiving means when the torque transmitting element is received in the torque transmitting element receiving means.

13. A clutch according to claim 12 wherein the restraining means comprises a first abutment mounted on the third member and a second abutment mounted on that member which is provided with the torque transmitting element receiving means.

14. A clutch according to claim 12 wherein the third member comprises a first part non-rotatably mounted relative to that member which is provided with the torque transmitting element receiving means and a second part which is mounted for rotational movement relative to the first part, the second part including the opening for the spacer element and the first part including an abutment which abuts the spacer element to restrain rotational movement of the second part when the torque transmitting element is received in the torque transmitting element receiving means.

15. A clutch according to claim 9 wherein there are provided a plurality of torque transmitting rolling elements, a plurality of torque transmitting abutments in the driving member, a plurality of torque transmitting abutments in the driven member, a plurality of torque transmitting element receiving apertures in the third member a plurality of spacer elements received in a plurality of openings in the third member, and a plurality of spacer element receiving means provided on at least one of the tracks.

16. A clutch according to claim 9 wherein the first track is axially located relative to the first member and the second track is axially located relative to the second member.

17. A clutch according to claim 9 wherein the torque transmitting element receiving means is separate from the torque transmitting abutment provided in the drive member.

18. A clutch according to claim 9 wherein the first member comprises the driven member and the second member comprises the driving member.

19. A clutch according to claim 9 wherein the spacer element is in rolling engagement with at least one of the tracks.

20. A clutch according to claim 9 wherein the torque transmitting element receiving means also comprises a torque transmitting abutment.

* * * * *